Patented Nov. 8, 1938

2,136,342

UNITED STATES PATENT OFFICE 2,136,342

PIGMENTED RUBBER HYDROHALIDES

James B. Holden, Akron, Ohio, assignor to Wingfoot Corporation, Wilmington, Del., a corporation of Delaware No Drawing. Application February 8, 1936, Serial No. 62,992

6 Claims. (Cl. 106—23)

This invention relates to the hydrohalide derivatives of rubber. More particularly, it relates to the compounding of such materials with pigments to yield very desirable products.

Hydrohalide derivatives of rubber are well known. It is also known that this type of material can be utilized to form films of excellent moistureproofness and other desirable physical characteristics. Rubber hydrochloride may be taken as representative.

One of the outstanding difficulties with films made of rubber hydrochloride is their tendency to deteriorate through ageing. Various methods have been proposed for retarding this deterioration.

It has now been discovered that this deterioration may be greatly retarded by incorporating into the rubber hydrochloride certain pigments. Besides imparting longer life to the film, certain of these pigments produce other outstanding effects of great usefulness and value.

The pigments are preferably added to the rubber hydrochloride cement prior to the spreading and formation of the film.

Any of the known methods of securing proper dispersion may be employed. It has been found, for example, that dry aluminum powder may be added directly to a seven percent solution of rubber hydrochloride in benzene and a satisfactory dispersion obtained by simple mixing, as by rolling or the use of a high speed stirrer. This does, however, tend to entrap air in the cement and produce pinholes in the subsequently formed film. This pinhole formation can be largely eliminated by allowing the cement to stand before spreading so that the air can separate. Perhaps even better results are obtained by using the aluminum in the paste form in which it is obtainable wetted with a gasoline fraction.

Of course, the finer particle pigments disperse with more difficulty and it may become advisable to grind the pigment, in a ball mill or otherwise, with the rubber hydrochloride cement or with the plasticizer which is to be incorporated in the cement.

One method which has been found very satisfactory with fine particle pigments, such as carbon black, has been to mill the pigment into a resin such as the chlorostannic acid reaction product of rubber. This pigmented resin is then dissolved in a small amount of benzene, with excellent pigment dispersion and this dispersion is added to the rubber hydrochloride cement.

Any other method of adding the pigment may be employed if desired.

Following are the formulae of a number of representative pigmented rubber hydrochloride films which demonstrate the invention, Sample A being an unpigmented control. Proportions are parts by weight. The term Pliolite is used to designate the chlorostannic acid reaction product of rubber.

Formulas

Sample A: Parts by weight
    Rubber hydrochloride_____ 100
    Butyl stearate_____ 10
    Hexylmethylene tetramine_____ 0.75

Sample B:
    Rubber hydrochloride_____ 100
    Butyl stearate_____ 10
    Pliolite_____ 8.2
    Titanium oxide_____ 13.9
    Hexamethylene tetramine_____ 0.75

Sample C:
    Rubber hydrochloride_____ 100
    Butyl stearate_____ 10
    Pliolite_____ 16.5
    Para red toner_____ 5
    Hexamethylene tetramine_____ 0.75

Sample D:
    Rubber hydrochloride_____ 100
    Butyl stearate_____ 10
    Pliolite_____ 16
    Chrome green_____ 4.6
    Lead chromate_____ 3.3
    Hexamethylene tetramine_____ 0.75

Sample E:
    Rubber hydrochloride_____ 100
    Butyl stearate_____ 10
    Pliolite_____ 24
    Prussian blue_____ 17.2
    Titanium dioxide_____ 12.8
    Hexamethylene tetramine_____ 0.75

Sample F:
    Rubber hydrochloride_____ 100
    Butyl stearate_____ 10
    Pliolite_____ 9.6
    Red iron oxide_____ 4.1
    Carbon black_____ 2.0
    Hexamethylene tetramine_____ 0.75

Sample G:
    Rubber hydrochloride_____ 100
    Butyl stearate_____ 10
    Pliolite_____ 16.5
    Carbon black_____ 5.0
    Hexamethylene tetramine_____ 0.75

Sample H:
    Rubber hydrochloride_____ 100
    Butyl stearate_____ 10
    Aluminum powder_____ 2.8
    Hexamethylene tetramine_____ 0.75

Films of these compositions and 0.001 inch thick were made and exposed to sunlight behind window glass on a roof at an angle of 45 degrees facing south. The following table shows the times required for the various films to become brittle.

| Sample | Hours exposure | |
|---|---|---|
| | 1st test | 2d test |
| A (control) | 47 | 43 |
| B | 30 | 21 |
| C | 40 | 29 |
| D | 40 | 29 |
| E | 40 | 47 |
| F | 100 | 65 |
| G | 228 | 237 |
| H | 100 | |

These data show the marked differences in effect of different pigments. Sample A, a clear, unpigmented film, is the control. Film B is much inferior to the control, C and D are somewhat inferior, E is about the same, and F, G and H are very much superior. Thus, various pigments affect the ageing qualities of the film not only in degree but actually in kind, i. e., to advantage or disadvantage. It is shown that some pigments very greatly increase the resistance to ageing of the film.

Of course, this method of adding to the useful life of the film cannot be employed when a clear, transparent product is desired. However, many applications arise in which opacity and color are no detriment or even an advantage.

According to the data above given, carbon black, red iron oxide, and aluminum are outstanding in anti-ageing action. Prussian blue also seems to have some beneficial effect. In Sample E, the Prussian blue very successfully neutralizes the detrimental effect of titanium dioxide which is demonstrated by Sample B.

Thus, it is intended that the invention shall include the use of pigments to improve the ageing of the film over that of the uncompounded material or to neutralize the ill effects of other compounding ingredients.

Also, it is not intended that the invention shall be limited to the use of only those materials which are shown by the included data to be beneficial. There are many other pigments and compoundings which are operable and the invention includes all of these.

It is not known for certain what mechanism is involved in the protective action of these pigments. It appears that they may function in two ways. It is known that ultra-violet light causes rubber hydrochloride to deteriorate. It is also known that aluminum reflects ultra violet light very efficiently. It is also, of course, well known that black and other dark bodies are very efficient absorbents of energy. It thus seems logical to suppose that these pigments function either by reflecting the ultra violet energy or by absorbing it and converting it to a less detrimental form such as the longer wave-length heat energy. Any pigment operating in either of these manners would be operable.

The product obtained by incorporating finely divided aluminum into rubber hydrochloride possesses other very desirable and noteworthy characteristics in addition to its improved ageing qualities. In the first place it possesses a very good metallic luster, which suggests its use, on an appearance basis, as an alternative for metallic aluminum foil. In several respects it is very much superior to metallic aluminum foil. The resistance to the diffusion of water vapor, carbon dioxide, and other gases is higher for rubber hydrochloride containing powdered aluminum than for the unpigmented film. This value is much superior to that obtained with metallic aluminum foil. This last perhaps surprising fact is explained by the fact that aluminum, in being rolled down to thin foil, tends to develop minute pinholes which render it less impervious to gas diffusion than might be supposed. My new product is also much stronger than aluminum foil, particularly in its resistance to tearing and creasing. Also, it retains the characteristic of unpigmented rubber hydrochloride of being heat sealable at moderate temperature, as, for example, at 230° F.

A wide variety of appearance effects are obtainable in this film of metallic appearance, as by the addition of dyes, the blending with other pigments, and the use of colored aluminum pigments.

Rubber hydrochloride film containing finely divided aluminum is, therefore, one of the preferred forms of the invention. However, many other compoundings are also included, as heretofore explained.

Thus, although only the preferred forms of the invention have been described in detail, it will be obvious to those skilled in the art that many modifications may be made therein without departing from the spirit of the invention or the scope of the appended claims, in which it is intended to cover by suitable expression in the appended claims all features of patentable novelty inherent in the invention.

What I claim is:

1. A rubber hydrohalide of increased resistance to ageing containing powdered aluminum.

2. A rubber hydrohalide film of increased resistance to ageing containing powdered aluminum.

3. A rubber hydrochloride film of increased resistance to ageing containing powdered aluminum.

4. A flexible, tear-resistant, heat-sealable film possessing metallic luster and having a high resistance to the diffusion of water vapor, which film comprises rubber hydrochloride and powdered aluminum.

5. A flexible, tear-resistant, heat-sealable film possessing metallic luster and having a high resistance to the diffusion of water vapor, which film comprises rubber hydrochloride, powdered aluminum and a dyestuff.

6. A flexible, tear-resistant, heat-sealable film possessing metallic luster and having a high resistance to the diffusion of water vapor, which film comprises rubber hydrochloride and a powdered metal.

JAMES B. HOLDEN.